J. MATHIS.
FUNNEL.
APPLICATION FILED FEB. 7, 1910.
977,414.
Patented Nov. 29, 1910.
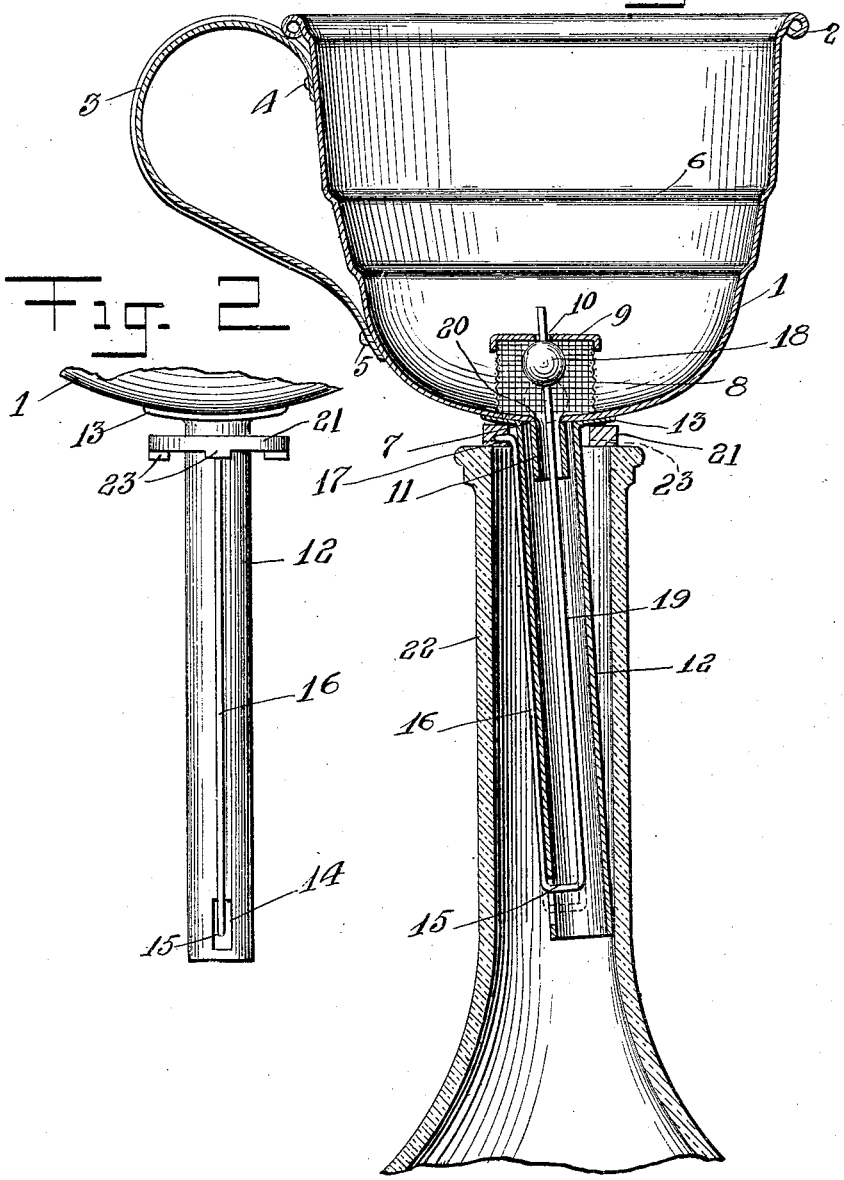
Witnesses
Morris Lessin
K. H. Butler
Inventor
JOHN MATHIS
By
Attorneys

UNITED STATES PATENT OFFICE.

JOHN MATHIS, OF GLASSPORT, PENNSYLVANIA.

FUNNEL.

977,414.  Specification of Letters Patent.  Patented Nov. 29, 1910.

Application filed February 7, 1910. Serial No. 542,513.

*To all whom it may concern:*

Be it known that I, JOHN MATHIS, a citizen of the United States of America, residing at Glassport, in the county of Allegheny and State of Pennsylvania, have invented certain new and useful Improvements in Funnels, of which the following is a specification, reference being had therein to the accompanying drawing.

This invention relates to funnels of the automatic self closing class and which are particularly designed for the use of saloon keepers, spirit rectifiers, bottle houses, fruit preservers and which can also be used for a culinary device and the essential object thereof is to provide a funnel of such class with means in a manner as hereinafter set forth for automatically closing the outlet of the funnel when the latter is removed from a bottle or other receptacle.

A further object of the invention is to provide a funnel of the foregoing class with a valvular means in a manner as hereinafter set forth and which will automatically close the outlet of the funnel when the latter is removed from a bottle or receptacle and to further provide the funnel with means whereby the valvular element can be conveniently manipulated after the funnel has been removed from the bottle or other receptacle to enable the draining off of the contents of the funnel.

Further objects of the invention are to provide an automatic self closing funnel which is designed primarily to simplify the construction of funnel disclosed in Letters-Patent 925,931—June 22, 1909, to set up an automatic self closing funnel which shall be simple in its construction, strong, durable, convenient in use and inexpensive to manufacture.

With the foregoing and other objects in view, the invention consists of the novel construction, combination and arrangement of parts as hereinafter more specifically described and illustrated in the accompanying drawings, wherein is shown the preferred embodiment of the invention, but it is to be understood that changes, variations and modifications can be resorted to which come within the scope of the claim hereunto appended.

In the drawings wherein like reference characters denote corresponding parts throughout the several views:—Figure 1 is a vertical sectional view of an automatic self closing funnel in accordance with this invention, showing the adaptation thereof with respect to the neck of a bottle, the latter being broken away, and Fig. 2 is a side elevation of the funnel broken away at its body.

Referring to the drawings in detail 1 denotes the bowl or body portion of the funnel and which is provided at its top with a bead 2. The bowl 1 may be of any suitable contour, but as shown is cup-shaped and provided with a handle 3 having the ends thereof fixed to the periphery of the bowl by the hold fast devices 4 and 5. The cup-shaped bowl 1 as shown is also provided with a plurality of interiorly arranged annular shoulders 6 which are downwardly inclined and formed by crimping the material from which the bowl is constructed, the material preferably being metal. Centrally of the bottom of the bowl 1 an outlet opening 7 is formed therein, and arranged over said opening and secured directly to the inner face of the bowl 1, is a cage 8 formed of a foraminous material and which constitutes a filtering medium to prevent foreign bodies from passing through the outlet openings 7. Secured to the top of the cage 8, the latter preferably being cylindrical in contour, is a flanged disk 9 formed with a centrally-disposed opening 10. Secured to the outer face of the bottom of the bowl 1 and forming a continuation of the wall of the outlet 7 is a nipple 11, which is disposed at an angle with respect to the vertical axis of the bowl 1.

Depending from the bowl 1 and disposed at an inclination with respect to the vertical axis of the bowl, is an elongated spout 12, of greater diameter than the nipple 11, as well as inclosing said nipple 11. The upper end of the spout 12 is provided with an outwardly-extending annular flange 13 which is secured in any suitable manner to the outer face of the bottom of the bowl 1. The spout 12 in proximity to its lower end, is provided with a rectangular slot 14 through which extends the angular lower end 15, of a vertically-disposed shifting rod 16, which also has an angular upper end 17.

Arranged within the cage 8 is a weighted valvular member 18 in the form of a sphere which is mounted upon a vertically-disposed valve stem 19, at a point removed from the upper end of said stem. The seat for the valvular element 18 is indicated at 20 and is formed by rounding the wall of the outlet 7 of the bowl 1. The stem 19 extends through the opening 10 in the disk 9, the wall of said opening constituting a guide for the upper portion of the stem. The disk 9 forms a stop for the upward movement of the valvular element 18, as shown clearly in Fig. 1. The stem 19 extends through the cage 8, nipple 11 and to a point in proximity to the lower end of the spout 12 and is formed integral with or connected to the inner terminus of the angularly-disposed lower end 15 of the rod 16.

Surrounding the spout 12 at the upper end thereof is an actuating collar 21 for the rod 16 which also has secured to its inner face, the angular upper end 17 of the rod 16 and by such an arrangement it is obvious, that when the collar 21 is mounted upon a support, as shown, the upper end of a bottle neck 22, the rod 16 and the stem 19 will be shifted so as to elevate the valve 18 from off its seat 20, as shown in Fig. 1. When the funnel is elevated, the weight of the collar and valve will shift the stem 19 and rod 16 in the opposite direction, until the valve engages the seat 20 whereby the outlet of the bowl of the funnel will be closed. The collar 21 has depending therefrom a plurality of spaced lugs 23, so that when the collar is mounted upon the top of the bottle neck 22, air can readily escape from the bottle as the latter is being filled.

When the funnel is in the position shown in Fig. 1, the valvular member 18 is held open, permitting the contents of the bowl 1 to flow into the spout 12 and owing to the inclination of the spout, the fluid as it is discharged therefrom will enter one side of the bottle during the filling operation.

The weight of the bowl 1 is sufficient to maintain the bottom thereof in engagement with the collar 21, when the funnel is placed in the neck of a bottle or other receptacle and when the funnel is in such position, as is shown in Fig. 1, the valvular member 18 will be held in an open position, allowing the contents of the funnel to enter the bottle.

Owing to the manner in which the valve stem 19 and the rod 16 are set up, they are entirely independent of the interior of the bowl as well as the handle of the funnel and under such conditions do not interfere with the operator's hand when filling the bowl of the funnel, thereby setting up a material advantage over the manner in which the stem and rod are arranged in the construction shown in the patent referred to.

What I claim is:—

A funnel provided with an outlet, a spout of greater diameter than said outlet, said spout secured at its lower end to the body of the funnel and surrounding the outlet and provided with a slot at a point removed from its lower end, a nipple secured to the body of the funnel and surrounded by the upper end of the spout and registering with said outlet, a collar surrounding the spout, a rod having its upper end extending into the body of the collar and having an angularly disposed lower end projecting through said slot into the lower portion of the spout, a valve stem extending through said outlet, nipple and into the spout and terminating in the right angular lower portion of said rod, said slot providing means whereby the valve stem can be shifted by the rod when the collar is mounted upon a support, a vertically disposed foraminous cylindrical casing connected directly at its lower end to the inner face of the body of the funnel and surrounding said outlet, a guide secured upon the top of and having its ends overlapping said casing and formed with a centrally disposed opening in alinement with the outlet, said valve stem projecting through said casing and the opening in said guide, said outlet having its wall beveled to constitute a valve seat, and a globular valve carried by the valve stem and interposed between said guide and the inner face of the body of the funnel and adapted to engage said seat to close the outlet when the funnel is elevated from or moved off a support.

In testimony whereof I affix my signature in the presence of two witnesses.

JOHN MATHIS.

Witnesses:
KARL H. BUTLER,
EVA A. MILNE.